(12) United States Patent
Matsubara (10) Patent No.: US 7,956,902 B2
(45) Date of Patent: Jun. 7, 2011

(54) IMAGING DEVICE (75) Inventor: Hiroki Matsubara, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 484 days.

(21) Appl. No.: 12/163,532

(22) Filed: Jun. 27, 2008

(65) Prior Publication Data

US 2009/0021599 A1 Jan. 22, 2009

(30) Foreign Application Priority Data

Jun. 29, 2007 (JP) ................................ 2007-173312

(51) Int. Cl.
*H04N 5/228* (2006.01)
*H04N 5/222* (2006.01)
*G06K 9/36* (2006.01)
*G06K 9/32* (2006.01)

(52) U.S. Cl. ................. 348/222.1; 348/333.02; 382/276; 382/295

(58) Field of Classification Search ............... 348/222.1, 348/333.02; 382/276, 295
See application file for complete search history.

(56) References Cited

U.S. PATENT DOCUMENTS 6,718,070 B2    4/2004   Hamamura

FOREIGN PATENT DOCUMENTS

| JP | 2001-236509 A | 8/2001 |
| JP | 2002-290818 A | 10/2002 |
| JP | 2002-344723 A | 11/2002 |
| JP | 2003-263643 A | 9/2003 |
| JP | 2006-287768 A | 10/2006 |
| JP | 2006-324948 A | 11/2006 |

*Primary Examiner* — Sinh Tran
*Assistant Examiner* — Mark Monk
(74) *Attorney, Agent, or Firm* — Crowell & Moring LLP (57) ABSTRACT

An imaging device determines whether, in an image captured by an imaging unit, straight lines exist which meet a condition of automatic vertical line determination (S14). If straight lines meeting the condition exist (YES in S15), the imaging device performs a vertical line determination process to extract vertical lines and so on (S16). On LCD, the imaging device displays the vertical lines extracted in S16 together with auxiliary lines including one connecting a calculated vanishing point and a target point (S17). The imaging device detects its inclination based on these lines including the vertical lines, and displays a message of "OK" on LCD when the inclination is within a predetermined range to notify a user to that effect. Thus, without increasing the manufacturing cost, the imaging device can prevent a user from capturing a target object while the imaging device is inclined to the horizontal direction in an image space.

6 Claims, 6 Drawing Sheets

1
IMAGING DEVICE

BACKGROUND OF THE INVENTION

1. Field of the Invention

The present invention relates to an imaging device, and more particularly to a technology for detecting an inclination of the imaging device.

2. Description of the Related Art

An imaging device operated by a user may capture an image of a target object (to be imaged) while the imaging device is undesirably inclined to the horizontal direction (or horizon) in a space or field of view to be imaged (such space or field of view being hereafter referred to as "image space") when it is difficult for the user to find the horizontal direction in the image space, such as when capturing an image while the imaging device is directed above the horizon in the image space. In this case, it may become necessary to modify the captured image. Conventionally, such an image is modified by trimming, such that the image is rotated by a predetermined angle, and then a peripheral portion of the image is removed. However, a trimmed image has a problem in that the composition of the trimmed image may not be what the user intended, because a portion of the image is removed by the trimming.

Various imaging devices are known in the related art. For example, Japanese Laid-open Patent Publication 2003-263643 discloses an imaging device which analyzes a captured image of a target object to be imaged so as to calculate vanishing points of three point perspective, and uses the distribution of the vanishing points so as to determine an image capturing direction of the target object. However, this imaging device determines the image capturing direction of the captured image, i.e. after capturing the image. Thus, it is not possible to prevent the user from capturing a target object while the imaging device is inclined to the horizontal direction in an image space.

Similarly, Japanese Laid-open Patent Publications 2002-344723 and 2001-236509 disclose imaging devices which detect an inclination of a captured image in an object space after capturing the image so as to rotate or trim the image. Thus, these patent publications cannot solve the above-described problems, either. On the other hand, Japanese Laid-open Patent Publications 2006-324948, 2006-287768 and 2002-290818 disclose imaging devices each provided with an inclination detection sensor for detecting an inclination of the imaging device. However, due to the necessity of providing the inclination detection sensor, it is difficult to reduce the manufacturing cost of the imaging device.

SUMMARY OF THE INVENTION

An object of the present invention is to provide an imaging device which, without increasing the manufacturing cost, can prevent a user from capturing a target object while the imaging device is inclined to the horizontal direction in an image space.

According to the present invention, this object is achieved by an imaging device comprising: imaging means having an imaging element for receiving light from, and capturing an image of, a target object on an image plane thereof and converting the received light to an electrical signal, and also having an optical system for guiding the image of the target object on the image plane of the imaging element so as to output image data of the captured image; control means for controlling respective units and elements of the imaging device; vertical reference line extracting means for extracting at least two vertical reference lines based on the image data output from the imaging means, the vertical reference lines serving as a vertical reference in a space to be imaged (hereafter referred to as "image space"); vanishing point calculating means for calculating an intersection (hereafter referred to as "vanishing point") of the at least two vertical reference lines; inclined line generating means for generating a straight line (hereafter referred to as "generated inclined line") connecting the vanishing point and a point (hereafter referred to as "target point") in the captured image which corresponds to an intersection between an optical axis of the optical system and the image plane; and inclination detecting means for detecting an inclination of the generated inclined line to a vertical axis (hereafter referred to as "inclination reference line") positioned in a frame of the captured image and passing through the target point on the image plane.

By using the inclination detected by the inclination detecting means, an inclination of the imaging device to the horizontal direction in the image space can be easily found (detected). Thus, the imaging device can prevent a user from capturing a target object while the imaging device is inclined to the horizontal direction in the image space. In addition, in contrast to conventional imaging devices, the imaging device does not use any special mechanisms or elements such as an inclination detection sensor, so that it can prevent an increase in the manufacturing cost.

Preferably, the inclination detected by the inclination detecting means is taken as an inclination of the imaging device to a horizontal direction in the image space. This facilitates the operation of the imaging device.

Further preferably, the imaging device further comprises notifying means which, when the inclination detected by the inclination detecting means is within a predetermined range, notifies a user to that effect, wherein the inclination detecting means successively detects a continuous change in position and orientation of the imaging device, and wherein when the inclination detected by the inclination detecting means is within the predetermined range, the notifying means notifies the user to that effect at each detection. This facilitates preventing the user from capturing a target object while the imaging device is inclined to the horizontal direction in the image space.

Further preferably, the imaging device further comprises: display means for displaying the image captured by the imaging means and the at least two vertical reference lines extracted by the vertical reference line extracting means; and selection operation means for selecting, from the at least two vertical reference lines displayed by the display means, vertical reference lines used to calculate the vanishing point to be calculated by the vanishing point calculating means, wherein the vanishing point calculating means calculates the vanishing point by using vertical reference lines selected by the user using the selection operation means. Thus, if automatically set vertical reference lines are not proper or acceptable to the user, the user can easily change the vertical reference lines, so that the user can be more surely prevented from capturing a target object while the imaging device is inclined to the horizontal direction in the image space.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
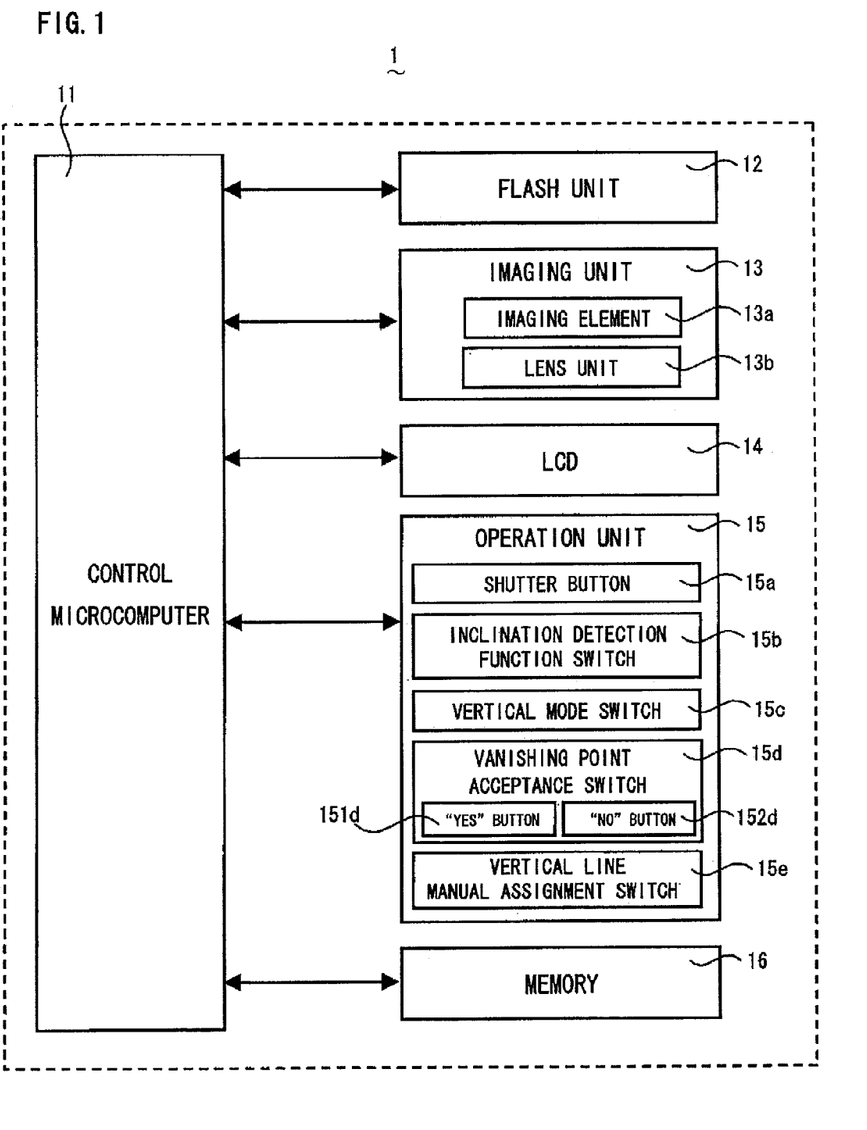
FIG. 1 is a schematic block diagram of an imaging device according to an embodiment of the present invention.

Embodiments of the present invention, as best mode for carrying out the invention, will be described hereinafter with reference to the drawings. The present invention relates to an imaging device. It is to be understood that the embodiments described herein are not intended as limiting, or encompassing the entire scope of, the present invention. Note that like parts are designated by like reference numerals, characters or symbols throughout the drawings. FIG. 1 is a schematic block diagram of an imaging device 1 according to an embodiment of the present invention. The imaging device 1 comprises: a flash unit 12 for irradiating light onto a target object to be imaged to allow imaging at night or in a room; an imaging unit (claimed "imaging means") 13 for imaging, and outputting image data of, the target object; an LCD (liquid crystal display) (claimed "display means" and "notifying means") 14 for displaying captured images, image data and various messages; and an operation unit 15 having buttons and so on for operating the imaging device 1. The imaging device 1 further comprises a memory 16 for storing captured images and various data, and a control microcomputer (claimed "control means") 11 for controlling the entire imaging device 1, namely respective units and elements of the imaging device 1.

The imaging unit 13 comprises an imaging element 13a formed of a CCD (Charge Coupled Device) for receiving light from the target object on an image plane thereof and converting the received light to an electrical signal; and a lens unit (optical system) 13b for focusing light from, or guiding an image of, the target object on the image plane of the imaging element 13a. Each of the images captured by the imaging unit 13 has a rectangular shape. When the imaging device 1 is in a normal posture or so-called horizontal posture (horizontal mode), the major (longitudinal) direction of the image is horizontal direction, while the minor (lateral) direction of the image is vertical direction. Note that the imaging element 13a can be formed not only of a CCD, but also of a CMOS (Complementary Metal Oxide Semiconductor).

The operation unit 15 has buttons and/or switches to be operated by a user which comprise: a shutter button 15a for capturing an image; an inclination detection function switch 15b for switching between on and off states of an inclination detecting function described later; and a vertical mode switch 15c for switching between on and off states of the vertical mode (posture) of the imaging device 1 (switching between vertical mode and horizontal mode) to switch between on and off states of a vertical mode analysis function (switching between vertical mode analysis and horizontal mode analysis). The operation unit 15 has a cursor display and moving function, and further comprises a vanishing point acceptance switch 15d and a vertical line (vertical line component) manual assignment switch 15e (claimed "selection operation means") which operates, for example, with the cursor display and moving function of the operation unit 15 under the control of the control microcomputer 11.

The shutter button 15a is a two-stage button with two stages of button pressing. In the first stage of button pressing, the shutter button 15a is pressed about halfway, which is referred to as "half-pressed" in the present specification. On the other hand, in the second stage of button pressing, the shutter button 15a is pressed fully, which is referred to as "full-pressed" in the present specification. When the shutter button 15a is half-pressed, the control microcomputer 11 controls the imaging unit 13 and so on to perform processes such as focusing on a target object to be imaged, and detecting an inclination of the imaging device 1 (inclination detecting process) under certain conditions. When the shutter button 15a is then full-pressed, the imaging device 1 captures an image of the target object while keeping the focus (focal point) on the target object.

The inclination detection function switch 15b is a single-stage button with a single stage of button pressing. Each time the inclination detection function switch 15b is pressed by the user, the on and off states of the inclination detecting function are switched between each other. The vertical mode switch 15c is also a single-stage button with a single stage of button pressing. Each time the vertical mode switch 15c is pressed by the user, the on and off states of the vertical mode analysis function (vertical mode analysis and horizontal mode analysis) are switched between each other (between vertical mode and horizontal mode). On the other hand, the vanishing point acceptance switch 15d is a switch operated by the user to select whether to accept a vanishing point described later, and has a "YES" button 151d and a "NO" button 152d. When accepting a vanishing point, the user operates the "YES" button 151d, while when not accepting the vanishing point, the user operates the "NO" button 152d. The vertical line manual assignment switch 15e is a switch to be operated by the user to manually assign a vertical line described later, and is designed such that the vertical line is assigned when the manual assignment switch 15e is pressed for a long time.

The memory 16 stores various information including data of captured images, on and off states of a later-described inclination detecting function as well as on and off states of a later-described manual assignment function of a vertical line (vertical line component). The control microcomputer 11 serves as claimed "vertical reference line extracting means", "vanishing point calculating means", "inclined line generating means" and "inclination detecting means". Further, the control microcomputer 11 has a later-described vertical mode analysis function which, when switched on (off) in the vertical (horizontal) posture of the imaging device 1, takes the longitudinal or major direction (lateral or minor direction) of a captured image as a vertical direction of a vertical line to be extracted as will also be described later. In addition, the control microcomputer 11 receives an image signal from the imaging unit 13, and subjects the thus received image signal to various image signal processings such as luminance signal processing and color difference signal processing so as to obtain image data from the image signal. The control microcomputer 11 outputs the image data to the LCD 14, and stores the image data in the memory 16.

Figure 2:
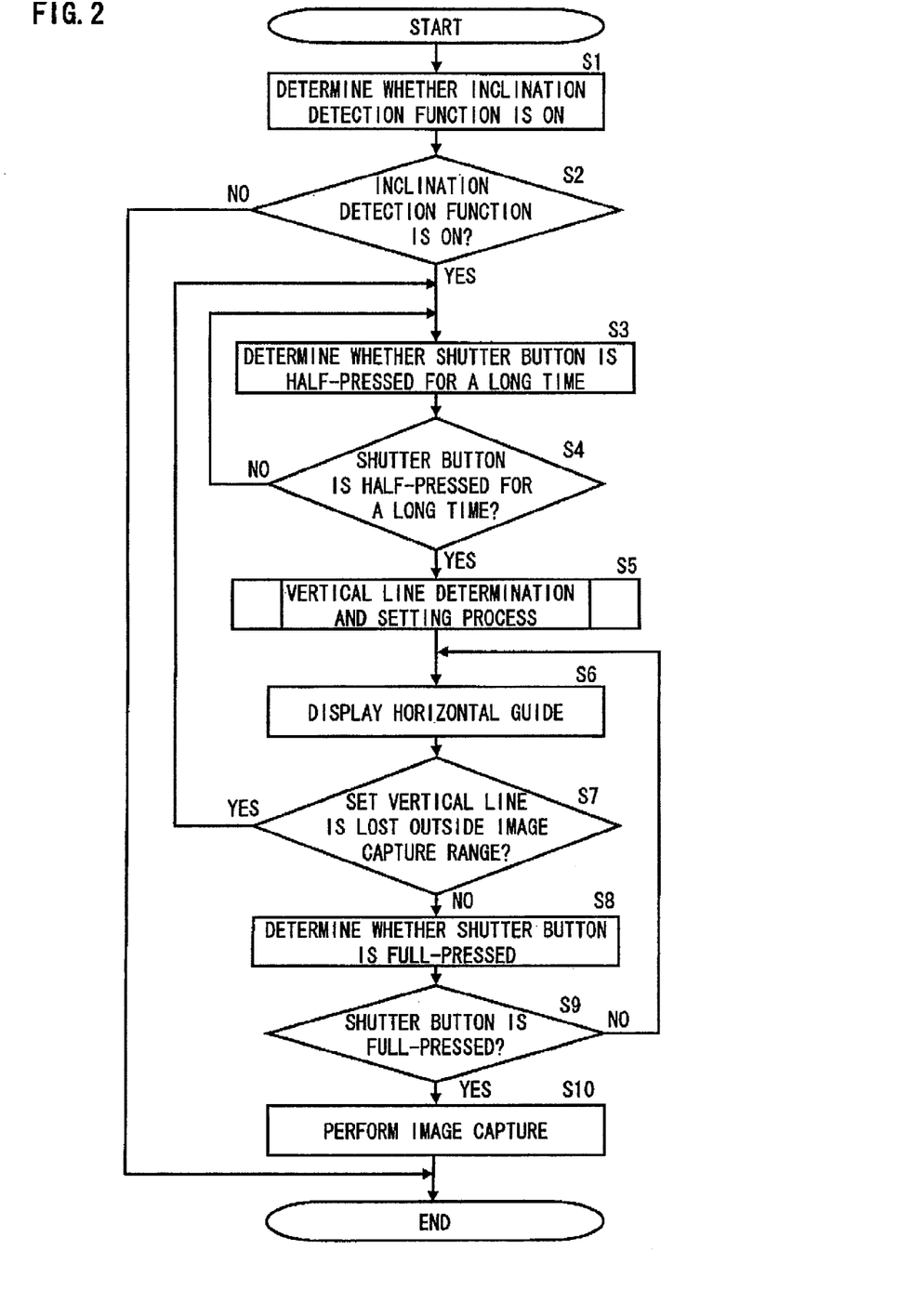
FIG. 2 is a flow chart showing an image capture operation of the imaging device using an inclination detection function.

Referring now to the flow chart of FIG. 2, the image capture operation of the imaging device 1 using the inclination detecting function will be described. First, the control microcomputer 11 refers to the memory 16 so as to determine whether the inclination detection function switch 15b is operated by a user to set the inclination detecting function in an on state (S1). If the determination is that the inclination detecting function is set in the on state (YES in S2), the control microcomputer 11 determines whether the shutter button 15a is half-pressed by the user for a predetermined time, i.e. for a long time (S3). On the other hand, if the determination is that the inclination detecting function is not set in the on state (i.e. is set in the off state) by the user operating the inclination detection function switch 15b (NO in S2), the microcomputer 11 does not perform the steps from S3 onward, and ends the process.

If the determination in step S3 is that the shutter button 15a is half-pressed for a long lime (YES in S4), the control microcomputer 11 performs a vertical line determination and setting process to determine and set vertical lines (vertical line components) (S5), and displays a horizontal guide on the LCD 14 (S6). Here, the horizontal guide is a collective term to describe auxiliary lines, angles (inclinations) and/or the like to indicate the horizontalness of the imaging device 1. The horizontal guide is successively renewed with a continuous change in position and orientation of the imaging device 1. When the imaging device 1 changes in position and orientation, the microcomputer 11 successively performs vertical line determination and setting processes to determine and set vertical lines corresponding to the changed positions and orientations of the imaging device 1.

Thus, following the successively set vertical lines, the control microcomputer 11 calculates and displays successive horizontal guides (i.e. successive groups of auxiliary lines, angles and/or the like) on the LCD 14. A detailed description of the vertical line determination and setting process in step S5 including the auxiliary lines and angles (inclinations) will be made later. Each time the inclination of the imaging device 1 relative to the image space (field of view) is within a predetermined range in each of the successive vertical line determination and setting processes, the microcomputer 11 displays a message of "OK" on the LCD to notify the user to that effect.

On the other hand, if the determination in step S3 is that the shutter button 15a is not pressed for a long lime (NO in S4), the control microcomputer 11 performs the determination step S3 again. Then, if one or more of the vertical lines set in step S5 above are lost outside an image capture range of the imaging unit 13 (YES in S7), the control microcomputer 11 performs the steps from S3 onward. If, on the other hand, none of the vertical lines is lost outside the image capture range (NO in S7), the control microcomputer 11 determines whether the shutter button 15a is full-pressed by the user (S8). If full-pressed (YES in S9), the control microcomputer 11 controls to perform image capture (S10), thereby ending the process. If not full-pressed (NO in S9), the control microcomputer 11 performs the steps from S6 onward.

Figure 3:
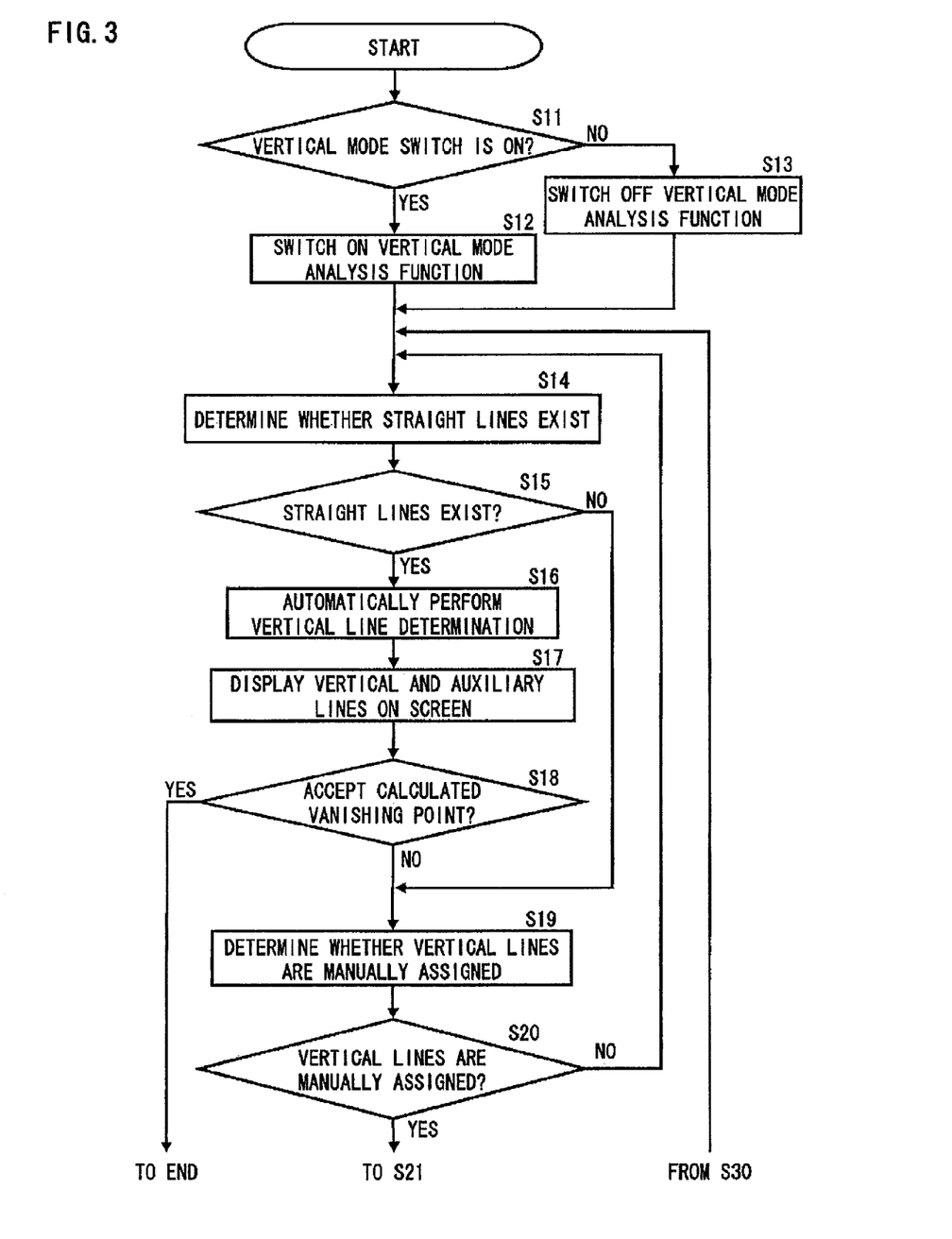
FIG. 3 is a first part and FIG. 4 is a second part of a flow chart showing details of a vertical line determination and setting process in the image capture operation; and Each of FIG. 5
Figure 4:
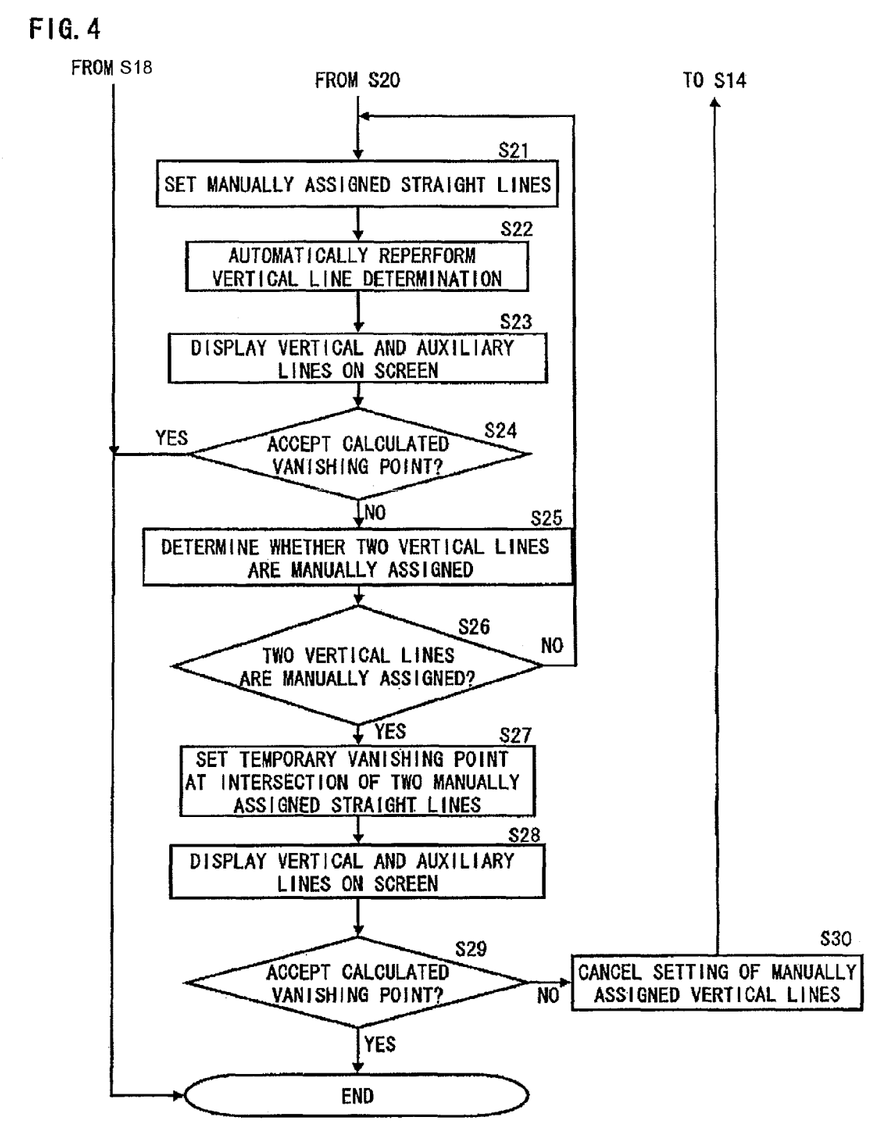

Next, a detailed description of the vertical line determination and setting process in step S5 will be made with reference to the flow chart of FIG. 3 and FIG. 4, in which FIG. 3 is a first part and FIG. 4 is a second part of the flow chart. First, the control microcomputer 11 determines whether the vertical mode switch 15c is in an on state so as to determine the orientation (posture) of the imaging device 1. If the determination is that the vertical mode switch 15c is in the on state (YES in S11), the control microcomputer 11 switches on the vertical mode analysis function (S12). On the other hand, if the determination is that the vertical mode switch 15c is not in the on state (NO in S11), the control microcomputer 11 switches off the vertical mode analysis function (S13).

Then, the control microcomputer 11 determines whether, in the image captured by the imaging unit 13, at least two straight lines (straight line components) exist which are oriented or extend in a direction close to a vertical direction (Y-axis) of a target object (to be captured) in an image space (S14) as described in detail below. If the determination is that at least two such straight lines exist (YES in S15), the control microcomputer 11 automatically performs a vertical line determination process (S16). On the other hand, if the determination in step S14 above is that at least two such straight lines do not exist (NO in S15), the control microcomputer 11 performs the steps from S19 onward without performing the steps from S16 to S18 as will be described below.

Before describing the steps from S14 to S16 in detail, the vertical direction (Y-axis) and the horizontal direction (X-axis) of the target object in the captured image will first be described. The Y-direction of the target object is a vertical direction of the target object itself. More specifically, the Y-direction normally is a direction perpendicular to the Earth. For example, FIG. 5 described later shows a building as an example of a target object. Each side of the building extends in a direction vertical or perpendicular to the Earth, which here is the Y-direction. The X-direction is a direction perpendicular to the Y-direction. The control microcomputer 11 performs the steps S14 to S16 in the following sequence of processes from P1 to P5:

P1. The control microcomputer 11 uses the Hough transform to extract two straight lines each located near the center of the captured image and extending in a direction close to the direction of the Y-axis;

P2. The control microcomputer 11 assumes an intersection of the two straight lines extracted in process P1 above as a temporary vanishing point;

P3. The control microcomputer 11 extracts, from the image of the target object, multiple straight lines which, when extended, pass near the temporary vanishing point;

P4. The control microcomputer 11 determines a distribution of coordinates of intersections between the extracted multiple straight lines, and also determines reliability values of each of the extracted multiple straight lines. Here, the reliability values of each straight line are values e.g. of the length, contrast and error of the image of the each straight line that indicate how reliable the each straight line is as a straight line attributed to the target object. The control microcomputer 11 calculates a weighted average of the reliability values of the multiple straight lines. Based on both this weighted average of the reliability values and the above-described distribution of the coordinates of the intersections, the control microcomputer 11 calculates a most reliable (most probable) vanishing point as an calculated vanishing point.

P5. The control microcomputer 11 extracts, from the straight lines converging toward the calculated vanishing point, top N straight lines (N is two in the example described below) in descending order of reliability value as vertical lines (claimed "vertical reference lines"), which serve as a vertical reference in the image space.

The control microcomputer 11 displays, on the LCD 14, the vertical lines (e.g. later-described first vertical line L1 and second vertical line L2) extracted and determined in step S16 together with auxiliary lines which include an auxiliary line (claimed "generated inclined line": e.g. later described Lv) connecting the calculated vanishing point (VP) and a target point (Pg) (S17). A detailed description of the vertical lines and auxiliary lines displayed on the LCD 14 will be made with reference to FIGS. 5 and 6 below. Note that the target point here is a point in the captured image corresponding to an intersection between the optical axis of the lens unit 13b (claimed "optical system") and the image plane of the imaging element 13a.

If the user operates the "YES" button 151d of the vanishing point acceptance switch 15d to accept the vanishing point calculated in step S16 above (YES in S18), the control microcomputer 11 ends the process. On the other hand, if the user operates the "NO" button 152d of the vanishing point acceptance switch 15d to not accept the vanishing point calculated in step S16 above (NO in S18), the control microcomputer 11 determines whether the user operates the vertical line manual assignment switch 15e to manually assign two straight lines for vertical lines (vertical line components) (two highest priority candidates of vertical lines) (S9). If the determination in step S19 is that the user does not manually assign straight lines for vertical lines (NO in S20), the control microcomputer 11 again performs the steps from S14 onward.

On the other hand, if the determination in step S19 above is that the user manually assigns two straight lines for vertical lines (YES in S20), the control microcomputer 11 sets the two straight lines manually assigned by the user as two highest priority candidates of vertical lines (S21). In order to assign two straight lines as such two vertical lines, the user operates the vertical line manual assignment switch 15e to select two portions of the captured image displayed on the LCD 14 and thereby assign two straight lines for vertical lines in e.g. the following way. For example, in the case where two straight lines (straight line components) which can be recognized by the user for vertical lines exist in the displayed image on the LCD 14, the user operates the operation unit 15 to move a cursor to each of the two straight lines, and presses the vertical line manual assignment switch 15e for a long time at each of the two straight lines so as to manually assign the two straight lines for vertical lines.

After two straight lines are manually set as two highest priority candidates of vertical lines in step S21 above, the control microcomputer 11 reperforms a vertical line determination process corresponding to the step S16 above, including processes P2 to P5 to: set a temporary vanishing point at the intersection of the two manually set straight lines; extract multiple straight lines passing near the temporary vanishing point; determine a calculated vanishing point, based on both a distribution of coordinates of intersections between the extracted multiple straight lines and a weighted average of reliability values of each of the extracted multiple straight lines; and extract top two straight lines converging toward the calculated vanishing point as vertical lines (S22). Similarly as in step S17, the control microcomputer 11 displays, on the LCD 14, the vertical lines extracted and determined in step S22 together with auxiliary lines which include an auxiliary line (claimed "generated inclined line") connecting the calculated vanishing point and a target point (S23).

If the user operates the "YES" button 151d of the vanishing point acceptance switch 15d to accept the calculated vanishing point calculated in step S22 above (YES in S24), the control microcomputer 11 ends the process. On the other hand, if the user operates the "NO" button 152d of the vanishing point acceptance switch 15d to not accept the vanishing point calculated in step S22 above (NO in S24), the control microcomputer 11 determines whether the user operates the vertical line manual assignment switch 15e to manually assign two straight lines for vertical lines (vertical line components) (two highest priority candidates of vertical lines) (S25).

If the determination in step S25 is that the user does not manually assign straight lines for vertical lines (NO in S26), the control microcomputer 11 again performs the steps from S21 onward. On the other hand, if the determination in step S25 is that the user manually assigns two straight lines for vertical lines (YES in S26), the control microcomputer 11 sets the two straight lines manually assigned by the user as two highest priority candidates of vertical lines, and also sets a temporary vanishing point at the intersection of the two manually assigned straight lines (S27). The control microcomputer 11 again reperforms a vertical line determination process corresponding to the step S16 above, including processes P2 to P5, to obtain a calculated vanishing point.

The control microcomputer 11 displays, on the LCD 14, the vertical lines together with auxiliary lines which include an auxiliary line (claimed "generated inclined line") connecting the calculated vanishing point and a target point similarly as in step S23 (S28). If the user operates the "YES" button 151d of the vanishing point acceptance switch 15d to accept the calculated vanishing point calculated in step S27 above (YES in S29), the control microcomputer 11 ends the process. On the other hand, if the user operates the "NO" button 152d of the vanishing point acceptance switch 15d to not accept the vanishing point calculated in step S27 above (NO in S29), the control microcomputer 11 cancels the setting of the manually assigned vertical lines for the vertical lines (S30), and again performs the steps from S14 onward.

Figure 5:
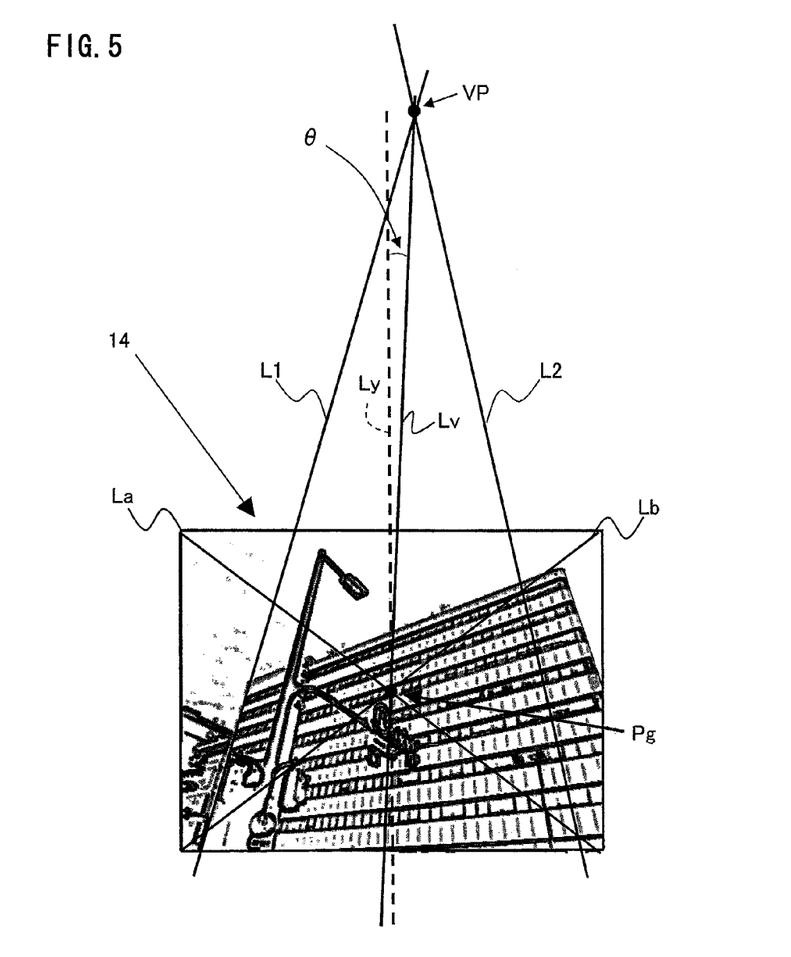
Figure 6:
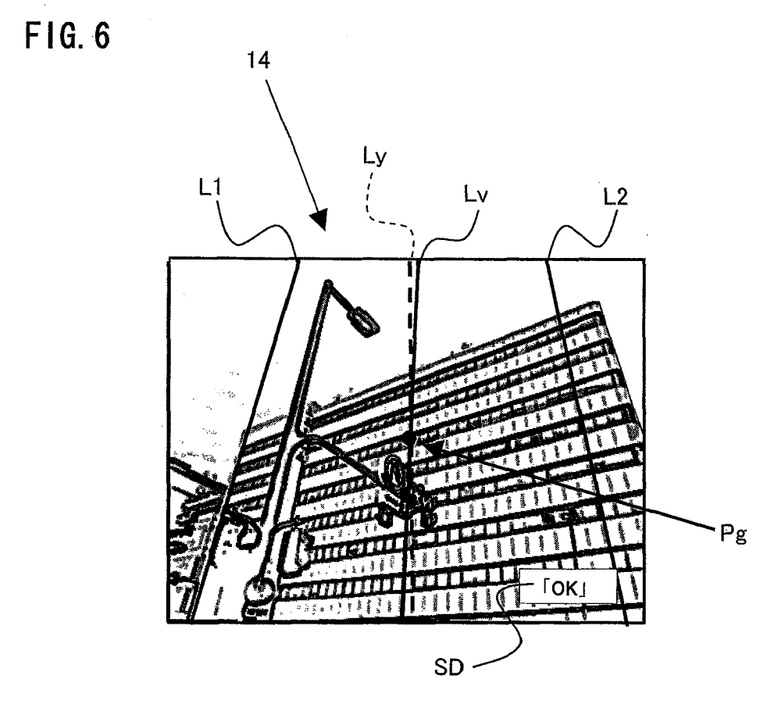
FIG. 6 is a view for explaining an image displayed on LCD, in which FIG. 5 also shows vertical and auxiliary lines not primarily displayed on LCD.

Next, referring to FIG. 5 and FIG. 6, screens displayed on the LCD 14 for displaying vertical lines and auxiliary lines will be described. Each of FIG. 5 and FIG. 6 is a view for explaining an image displayed on the LCD 14, showing an image captured by looking up at a building, in which for the purpose of explanation, FIG. 5 shows vertical and auxiliary lines which are not primarily displayed on the LCD 14. In FIG. 5, L1 and L2 are first and second vertical lines as determined, VP is a calculated vanishing point, and Pg is a target point, while Lv is an auxiliary line (generated inclined line) connecting the calculated vanishing point and the target point, Ly is a vertical axis (inclination reference line) positioned in a frame of a captured image and passing through the target point Pg on the image plane, La and Lb are first and second diagonals of the screen, and θ is an inclination of the auxiliary line Lv from the vertical axis Ly corresponding to an inclination of the imaging device 1 to the horizontal direction in the image space.

In the object space, the first and second vertical lines L1 and L2 are basically mutually parallel straight lines parallel to the vertical direction. The target point Pg is an intersection of the first and second diagonals La and Lb. As shown in FIG. 6, the LCD 14 displays the first and second vertical lines L1, L2, the auxiliary line Lv and the vertical axis Ly as well as a state display SD to notify a user of an inclination state of the imaging device 1 from the vertical axis Ly. If the inclination θ shown in FIG. 5 is within a predetermined range such as a range of 1 (one) degree, the state display SD displays "OK", while if not within the predetermined range (1 degree range), the state display SD displays "NG". Thus, the imaging device 1 can notify the user to that effect or of the inclination state thereof from the vertical axis Ly or the horizontal direction.

As described in the foregoing, the imaging device 1 according to an embodiment of the present invention detects an inclination of a frame of a captured image (i.e. inclination of the imaging device 1) to the horizontal direction (or horizon) of the image space from an inclination detected by the control microcomputer 11 (inclination detecting means), such that the inclination detected by the control microcomputer 11 is taken as the inclination of the imaging device 1 to the horizontal direction (or horizon) in the image space. This is an easy way of finding (detecting) an inclination of the imaging device to the horizontal direction. Thus, the imaging device 1 can prevent a user from capturing a target object while the imaging device 1 is inclined to the horizontal direction in the image space, thereby facilitating determination of a frame of an image to be captured.

In contrast to conventional imaging devices, the imaging device 1 does not use any special mechanisms or elements such as an inclination detection sensor, so that it can prevent an increase in the manufacturing cost. Furthermore, when the detected inclination is within a predetermined range, the imaging device 1 displays a message on the LCD to that effect for notification to a user at each detection. This also makes it possible for the imaging device 1 to prevent a user from capturing a target object while the imaging device 1 is inclined to the horizontal direction in the image space, also facilitating determination of a frame of an image to be captured. In addition, according to the imaging device 1, the user can manually select straight line portions of an image displayed on the LCD 14, and assign and set the straight lines for vertical lines. Thus, even if automatically set vertical lines are not proper or acceptable to the user, the user can manually set and extract vertical lines, and evaluate the inclination of the imaging device properly.

It is to be noted that the present invention is not limited to the above-described embodiments, and various modifications are possible within the scope which does not change the spirit the present invention. For example, when the inclination is within a predetermined range, the imaging device 1 according to the embodiment of the present invention described above displays, as an example, a message of "OK" on the LCD 14 for notification to a user. However, die message is not limited thereto, and can be a sound output from a speaker saying "OK" for the notification purpose.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application filed Jun. 29, 2007, the content of which is hereby incorporated by reference.

What is claimed is:

1. An imaging device comprising:
    imaging means having an imaging element for receiving light from, and capturing an image of, a target object on an image plane thereof and converting the received light to an electrical signal, and also having an optical system for guiding the image of the target object on the image plane of the imaging element, so as to output image data of the captured image;
    control means for controlling respective units and elements of the imaging device;
    vertical reference line extracting means for extracting at least two vertical reference lines based on the image data output from the imaging means, the vertical reference lines serving as a vertical reference in a space to be imaged, which space to be imaged is an image space;
    vanishing point calculating means for calculating an intersection of the at least two vertical reference lines, which intersection is a vanishing point;
    inclined line generating means for generating a straight line, which straight line is a generated inclined line, connecting the vanishing point and a point in the captured image which corresponds to an intersection between an optical axis of the optical system and the image plane, which point is a target point; and
    inclination detecting means for detecting an inclination of the generated inclined line to a vertical axis positioned in a frame of the captured image and passing through the target point on the image plane, which vertical axis is an inclination reference line.

2. The imaging device according to claim 1, wherein the inclination detected by the inclination detecting means is taken as an inclination of the imaging device to a horizontal direction in the image space.

3. The imaging device according to claim 2, which further comprises notifying means which, when the inclination detected by the inclination detecting means is within a predetermined range, notifies a user to that effect,
    wherein the inclination detecting means successively detects a continuous change in position and orientation of the imaging device, and
    wherein when the inclination detected by the inclination detecting means is within the predetermined range, the notifying means notifies the user to that effect at each detection.

4. The imaging device according to claim 3, which further comprises:
    display means for displaying the image captured by the imaging means and the at least two vertical reference lines extracted by the vertical reference line extracting means; and
    selection operation means for selecting, from the at least two vertical reference lines displayed by the display means, vertical reference lines used to calculate the vanishing point to be calculated by the vanishing point calculating means,
    wherein the vanishing point calculating means calculates the vanishing point by using vertical reference lines selected by the user using the selection operation means.

5. The imaging device according to claim 1, which further comprises notifying means which, when the inclination detected by the inclination detecting means is within a predetermined range, notifies a user to that effect,
    wherein the inclination detecting means successively detects a continuous change in position and orientation of the imaging device, and
    wherein when the inclination detected by the inclination detecting means is within the predetermined range, the notifying means notifies the user to that effect at each detection.

6. The imaging device according to claim 1, which further comprises:
    display means for displaying the image captured by the imaging means and the at least two vertical reference lines extracted by the vertical reference line extracting means; and
    selection operation means for selecting, from the at least two vertical reference lines displayed by the display means, vertical reference lines used to calculate the vanishing point to be calculated by the vanishing point calculating means,
    wherein the vanishing point calculating means calculates the vanishing point by using vertical reference lines selected by the user using the selection operation means.

* * * * *